United States Patent [19]
Alvarez

[11] 3,856,288
[45] Dec. 24, 1974

[54] MULTISTAGE SPRING ASSEMBLY
[76] Inventor: Bernard V. Alvarez, Rt. 1, Box 32, Inman, S.C. 29349
[22] Filed: Dec. 13, 1973
[21] Appl. No.: 424,472

[52] U.S. Cl. .................................. 267/73, 74/526
[51] Int. Cl. ............................................. F16f 1/12
[58] Field of Search ........... 267/73, 74, 69; 74/526, 74/513, 514

[56] References Cited
UNITED STATES PATENTS
1,448,741   3/1923   Gorrell.................................. 267/73

Primary Examiner—James B. Marbert
Attorney, Agent, or Firm—Wellington M. Manning, Jr.

[57] ABSTRACT

A multistage spring assembly is disclosed and claimed herein. A pair of extension type, coil springs are associated in such fashion that an axial force received thereby will extend one of the springs only, up to a predetermined position, at which position continued and additional force will extend both of the springs simultaneously. Preferably, one of the springs is received within the other spring; one of the two springs is provided with eyelets located axially beyond the coil portion thereof; and the other spring is provided with elongated members at opposite ends which pass through the eyelets and receive the axial forces on the assembly. A preferred use of the spring assembly of the present invention is found in the linkage system controlling a vehicle carburetor throttle. One driving a vehicle equipped with the present assembly may easily depress the accelerator up to the point at which both springs begin to extend where a comfortable foot rest is provided. Further depression of the accelerator may, however, be accomplished by exertion of sufficient force to extend both springs.

15 Claims, 6 Drawing Figures

MULTISTAGE SPRING ASSEMBLY

BACKGROUND OF THE INVENTION

Springs, and further, multistage springs have been in existence for years. Moreover, such springs have been employed in industrial environs too numerous to mention, including the automotive industry for control of a gas pedal or accelerator to control the amount of fuel supplied to the automotive engine and thus the resultant speed of the vehicle.

By way of example, numerous devices have heretofore been employed beneath an accelerator pedal, being located between the pedal and the floorboard of the vehicle so as to stiffen the pedal whereby greater than normal force is required for depression of the accelerator. True, this particular type device impedes the depression of the accelerator and provides a rest of sorts for one utilizing the vehicle. Quite disadvantageously, however, once the spring or other device is depressed to its fullest extent, further depression of the pedal is extremely difficult. A further exemplary approach to springs for automotive uses involves the use of an extension and a compression spring whereby one of the two types of springs is actuated upon receipt of an initial force with the other of the springs only being actuated upon receipt of a force exceeding a predetermined amount. In use of combination compression and extension springs, however, it is first noted that substantial additional apparatus is required so as to suitably fabricate the assembly. Secondly, depending upon the precise relationship between the springs, the assembly may or may not be accurate in a repetitive sense. In other words, one of the two springs may fail to the detriment of repetitious use which, of course, may be both required and necessary.

The spring assembly of the present invention provides an improved approach to the problem of control of fuel consumption in a vehicle without major modification to the engine. With a present energy crisis spreading throughout the country, it is encumbent upon each driver to economize as much as possible in the operation of each vehicle. The present invention will not per se result in a reduction of engine fuel consumption. Instead, the present invention enables the operator of the vehicle to remain constantly aware of the position of the accelerator depression, whereby through cognizance of speed, the operator will himself maintain a sufficiently low speed so as to realize the desired reduction in fuel consumption.

The present invention is not anticipated or suggested by any known prior art. Exemplary of the known prior art are U.S. Pat. Nos. 575,451 to Yost; 2,352,136 to Ten Eyck; 2,381,390 to Vanke, and 2,661,941 to Smith.

SUMMARY OF THE INVENTION

It is an object of the present invention to provide a novel multistage spring assembly.

Another object of the present invention is to provide a novel multistage spring assembly utilizing two extension type coil springs.

Yet another object of the present invention is to provide a spring assembly that is suitable for use in an automotive carburetor throttle linkage system.

Still further, another object of the present invention is to provide a novel multistage spring assembly wherein two springs of different characteristics are utilized.

Generally speaking, the present invention relates to a spring assembly comprising a pair of extension type coil springs in operative association, a first of said springs having stop means provided thereon and a second of said springs having means thereon guiding said second spring into contact with said stop means, said second spring being individually extended upon receipt of an axial force thereon to contact with said stop means and thereafter simultaneously extended with said first spring.

More specifically, the spring assembly of the present invention preferably includes a pair of coil springs, one located within the other, with one of the coil springs having eyelets integral therewith and extending axially therefrom, while the other of said springs has an elongated member extending outwardly through said eyelets and being adopted at the outer ends thereof for attachment along the throttle linkage system of a vehicle.

The eyelets or other type stop means may be completely integral with the coil spring or may be a grommet type eyelet that is secured to the spring in suitable fashion. Furthermore, the eyelets may be provided adjacent the center line passing axially through their respective spring when provided on the outer spring. Generally the eyelets are located along a line approximately tangent to the circumference of the coils when located on the inner spring. Likewise, in the latter situation, the generally tangent eyelets may be provided on a spring that is completely outside the other spring whereby the two springs are parallel, or in some other side by side arrangement.

While desirably and preferably, eyelets are provided at both ends of one of the springs with the elongated members likewise being provided on both ends of the other spring and passing through the eyelets, certain embodiments of the present invention encompass the individual or collective securement of the two springs at an end opposite the stop means or eyelets. In this general embodiment, one further specific embodiment encompasses the provision of a hook means on the inner spring that passes around a portion of a coil of the outer spring so as to secure the two springs together at one end. The outer spring of such arrangement further has an elongated member that extends outwardly therefrom and provides a means for securing the assembly at one point along the linkage. A further specific embodiment where the springs are secured to each other employs a third member that secures the inner spring and outer spring to each other and extends outwardly therefrom so as to provide a source of attachment of the assembly, per se.

DESCRIPTION OF THE PREFERRED EMBODIMENTS

Figure 1:
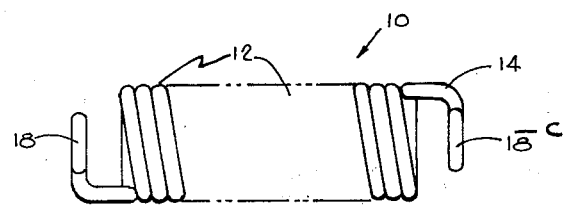
FIG. 1 is a side view of a first spring according to the present invention.
Figure 2:
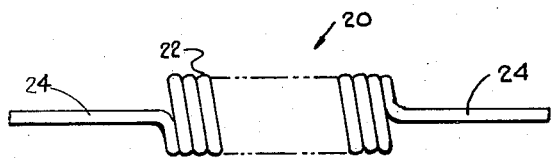
FIG. 2 is a side view of a second spring of a spring assembly according to the teachings of the present invention.
Figure 3:
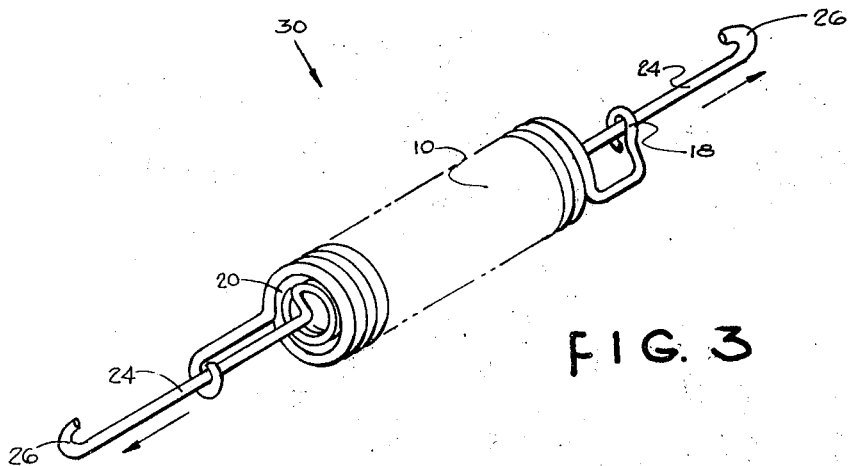
FIG. 3 is an isometric view of a spring assembly according to the teachings of the present invention.

Referring to the Figures, preferred embodiments of the present invention will now be described in detail. Referring specifically to FIGS. 1–3, a preferred spring assembly embodiment according to the teachings of the present invention is illustrated. A first outer spring generally indicated as 10 is provided with a plurality of coils 12 in juxtaposition along the length thereof. At opposite ends of coils 12 are eyelets 18. Eyelets 18 are integral with spring 10 being formed from an extension 14 of coils 12. As shown in FIG. 1, eyelets 18, which are also referred to herein as guide means and stop means, are located along an approximate center line C that extends axially through spring 10.

FIG. 2 illustrates an inner spring generally indicated as 20 of the extension type. Inner spring 20 is provided with a plurality of juxtaposed coils 22 that define the length thereof. At opposite ends of coils 22 are elongated members 24 having hook portions 26 or other attachment means at the outer ends thereof. The assembly generally indicated as 30 in FIG. 3 shows outer spring 10 with inner spring 20 received therewithin and extending axially therealong. Elongated members 24 of inner spring 20 extend through eyelets 18 of outer spring 10 with hooks 26 provided outwardly therefrom. In use, elongated members 24 of inner spring 20 are secured in the carburetor throttle linkage system of a vehicle. Depression of the accelerator by the operator of the car applies an axial force on the assembly in the direction of the arrows on elongated members 24. Since members 24 are loosely received in eyelets 18, inner spring 20 extends individually outwardly without applying any appreciable force on outer spring 10. At a predetermined force, inner spring 20 engages eyelets 18 of outer spring 10. At this point, no further individual extension of inner spring 20 is permitted without a simultaneous extension of outer spring 10. In other words, once the predetermined amount of force is realized, both inner spring 20 and outer spring 10 are extended so long as engagement between inner spring 20 and eyelets 18 and a force exceeding the predetermined amount are realized. Once the force is reduced, inner spring 20 returns towards its original position by an amount dictated by the decrease in the force and thus releases tension on eyelets 18, thus permitting outer spring 10 to likewise return towards its original position where the respective coils 12 and 22 are juxtaposed in the formation of helices along the length of the springs.

The type arrangement shown in FIG. 3 as well as the other embodiments of the present invention permit continued operation of the accelerator pedal of the vehicle without spring failure. One operating the vehicle equipped with the spring assembly of the present invention may depress the accelerator and initially experience only the tension of inner spring 20. Upon reaching the predetermined force which corresponds to a particular rate of speed, such as 55 miles per hour, for example, inner spring 20 engages eyelets 18 of outer spring 10 so as to thereafter include the force of spring 10 also. A perceptibly greater amount of force is required to further depress the accelerator. A built-in rest stop is thus produced for the operator of the vehicle to maintain a safe speed. Likewise, a constant reminder is provided that at this particular point (greater force required to depress the accelerator), a desirable speed is now being attained. Hence, when the further degree of pressure required to extend both springs is exerted, more fuel is being consumed, greater vehicle speed will be attained, both of which may be considered to be excessive for the circumstances.

Figure 4:
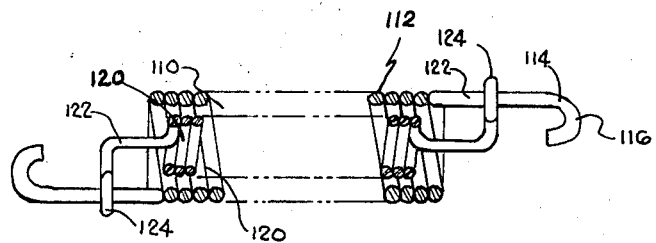
FIG. 4 is a vertical cross sectional view of a further embodiment of a spring assembly according to the teachings of the present invention.
Figure 5:
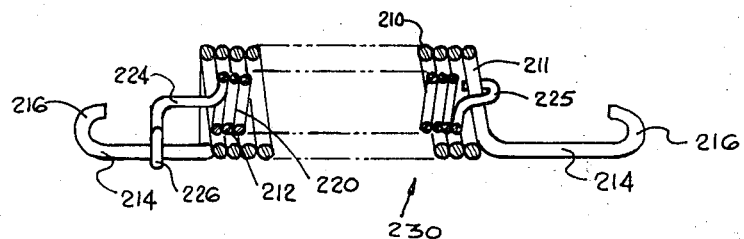
FIG. 5 is a vertical cross sectional view of another embodiment of a spring assembly according to the teachings of the present invention.
Figure 6:
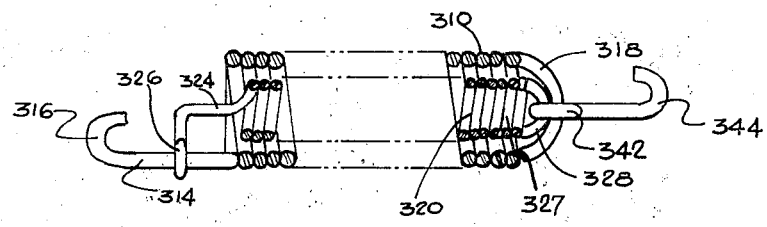
FIG. 6 is a vertical cross sectional view of yet a further embodiment of a spring assembly according to the teachings of the present invention.

Further embodiments of the present invention are illustrated in FIGS. 4–6 and will hereafter be discussed independently of each other. In FIG. 4, an outer spring 110 is provided having elongated members 114 with hooks or the like 16. Outer spring 110 is of the extension coil type and is produced from a series of coils 112 in juxtaposition to each other. An inner spring 120 is provided having elongated members 122 extending outwardly from opposite ends thereof with eyelets 124 provided at the outer ends thereof. Eyelets 124 receive elongated members 114 of spring 110 therethrough and serve as stop means as described hereinbefore. While inner spring 120 is shown within outer spring 110 in FIG. 4, where eyelets 124 are located adjacent the circumference of the spring, it would likewise be suitable to position spring 120 without outer spring 110 and parallel thereto. Such an arrangement would be equally suitable, though for space conservation, it is deemed preferable to utilize one spring within the other.

In FIG. 5, an outer spring 210 is provided having an elongated member 214 and associated hook 216 or the like extending from both ends thereof, though at one end thereof, a portion 211 of elongated member 214 is formed to pass across an approximate center of spring 210, the purpose of which will be discussed immediately hereinafter. Inner spring 220 is comprised of a plurality of coils 212 with an elongated member 224 and an eyelet 226 at an outer end thereof. An opposite end of spring 220 is provided with a hook 225 which passes around section 211 of elongated member 214 of spring 210. As such, hook 225 secures inner spring 220 to outer spring 210. Axial force on the spring assembly of FIG. 5, generally indicated as 230, permits elongated member 214 of outer spring 210 to extend outer spring 210. Once the predetermined amount of force is realized, outer spring engages eyelet 226 of inner spring 220, and a further amount of force is required to extend the two springs simultaneously, the operation of which is, in essense, the same as the other embodiments set forth herein.

In FIG. 6, an outer spring 310 is provided again having an elongated member 314 with a terminal hook or the like 316. An opposite end of spring 310 is provided with a loop 318. An inner spring 320 is provided having an elongated member 324 with an eyelet for guide means 326. An opposite end of spring 320 finds a further closed eyelet 328 immediately adjacent the coils 327. A securement member 340 is provided having an eyelet 342 formed around loop 318 and eyelet 328 so as to secure inner spring 320 to outer spring 310. An opposite end of securement member 340 is provided with an attachment means 344 such as a hook or the like. As described with respect to the spring embodiment of FIG. 5, the assembly of FIG. 6 likewise extends outwardly in one direction only with the end where securement member 340 is provided being secured in place. Axial force thus is provided on outer spring 310 via elongated member 314 so as to permit extension of outer spring 310 independently of inner spring 320 until outer spring 310 engages eyelet 326. At that point, a force exceeding the predetermined amount of force is required since both springs 310 and 320 will simultaneously extend so as to bring into play the second stage of the multistage spring assembly.

In constructing the spring assemblies according to the teachings of the present invention, several embodiments are quite possible. In this regard, note that during manufacture of certain embodiments, it may be necessary to form the eyelets or guide means around elongated means so as to secure the assembly and prevent the inadvertent disassembly of the pair of springs. It should be pointed out, however, that the size and strength of the springs is up to the dictates of the particular environment in which the multistage assembly is to be employed, as is formation of the springs. In this regard, for example, while hooks are shown as terminal attachment means for the spring assemblies, obviously any desired formation may be employed so as to adequately secure the spring assembly in its desired location in which it is to be employed. Likewise, the strength of the springs may be the same or may differ. Further, the physical location of the springs may be modified by spring forming techniques.

Having described the present invention in detail, it is obvious that one skilled in the art will be able to make variations and modifications thereto without departing from the scope of the invention. Accordingly, the scope of the present invention should be determined only by the claims appended hereto.

What is claimed is:

1. A spring assembly comprising a pair of extension type coil springs in operative association, a first of said springs having stop means integral therewith and a second of said springs having means integral therewith guiding said second spring into contact with said stop means, said second spring being individually extended upon receipt of an axial force thereon to contact with said stop means and thereafter simultaneously extended with said first spring.

2. A spring assembly as defined in claim 1 wherein said first spring has stop means provided at opposite ends thereof and said second spring has an elongated guide means extending through each stop means.

3. A spring means as defined in claim 2 wherein said stop means are eyelets.

4. A spring assembly as defined in claim 3 wherein said eyelets are located approximately along a center line through said first spring and said first spring is located outside said second spring.

5. A spring assembly as defined in claim 1 wherein said second spring is located within said first spring and wherein said first and second springs are secured to each other at one end thereof.

6. A spring assembly as defined in claim 5 wherein said second spring is secured to said first spring by a separate member, said separate member extending outwardly therefrom and being adapted for attachment at an outer end thereof.

7. A spring assembly comprising:
   a. a first extension type, coil spring, said spring having stop means integral therewith and located at opposite ends thereof;
   b. a second, extension type, coil spring having elongated members integral therewith and extending through said stop means, whereby said second spring extends individually upon receipt of sufficient axial force thereon and is guided into contact with said stop means, whereby both of said simultaneously springs extend thereafter.

8. A spring assembly as defined in claim 7 wherein said first spring is received around said second spring and said stop means are located proximate a center line extending axially through said spring.

9. A spring assembly as defined in claim 7 wherein said first spring is located within said second spring and said stop means are located adjacent a line generally tangent with the approximate circumference of said spring.

10. A spring assembly comprising:
    a. a first extension type, coil spring, said spring having stop means located axially outwardly therefrom and integral therewith; and
    b. a second, extension type, coil spring having an elongated member integral therewith, said elongated member passing through said stop means, said springs being secured to each other at an end thereof opposite said stop means, said second spring only being extended upon receipt of an axial force thereon up to a predetermined amount at which point said second spring engages said stop means, and both of said springs extend thereafter upon continued axial force in excess of said predetermined amount.

11. A spring assembly as defined in claim 10 wherein said springs are secured to each other by a third member, said third member securing said springs and extending outwardly therefrom and being adapted for attachment at an outer end.

12. In a power train for a vehicle including an accelerator pedal, an energy supply source and connecting means associating said accelerator pedal with said energy supply source, the improvement comprising a spring assembly located along said connecting means, said spring assembly comprising a pair of extension type coil springs in operative association, a first of said springs having stop means provided thereon and a second of said springs having means guiding said second spring into contact with said stop means, said second spring being individually extended upon receipt of force thereon due to depression of said accelerator pedal to the point of contact with said stop means and thereafter simultaneously extended with said first spring upon receipt of force thereon.

13. The spring assembly improvement as defined in claim 12 wherein said stop means are eyelets and said guide means are elongated members passing through said eyelets.

14. The spring assembly improvement as defined in claim 13 wherein said second spring is located within said first spring.

15. The spring assembly improvement as defined in claim 12 wherein said stop means and said guide means are integral with their respective springs.

* * * * *